Aug. 14, 1934.  H. R. TEAR  1,969,915

LUBRICATING DEVICE

Filed Oct. 15, 1932

INVENTOR.
HARRY B. TEAR
BY
ATTORNEY.

Patented Aug. 14, 1934

1,969,915

UNITED STATES PATENT OFFICE 1,969,915

LUBRICATING DEVICE

Harry R. Tear, South Bend, Ind., assignor to The Lubrication Corporation, South Bend, Ind., a corporation of Delaware Application October 15, 1932, Serial No. 637,915

8 Claims. (Cl. 285—143)

This invention relates to improvements in lubricating devices and more particularly to lubricant discharge nozzles of the type adapted for clamping engagement with a lubricant receiving fitting.

An object of the invention is to provide a clamp type nozzle which is capable of approach and clamping attachment upon a lubricant receiving fitting with ease regardless of the angular disposition of the fitting axis. This feature is of particular importance in such cases as where the fitting is disposed on the under side of the bearing or receiving member.

A further object is to provide a clamp type lubricant discharge nozzle which is simple in construction and which may be manufactured at relatively low cost.

Another object is to provide a clamp type discharge nozzle wherein those parts most subjected to wear may be readily replaced without disassembling the entire nozzle.

Another object is to provide in a lubricant discharge nozzle, a novel leakproof swivel joint between the body and inlet conduit thereof.

Other objects, the advantages and uses of the invention, will be, or should become apparent after reading the following description and claims and after consideration of the accompanying drawing forming a part of this specification, in which:

Figure 1:
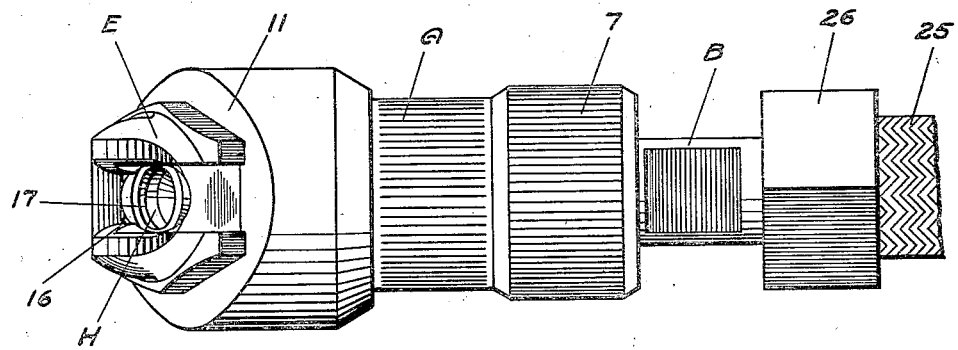
Fig. 1 is a bottom plan view of a lubricant discharge nozzle constructed in accordance with the invention.

In general, the lubricant pressure operated clamp type discharge nozzle selected for illustration herein comprises, a body A, having an inlet conduit B connected therewith through a swivel joint C, and having an internally threaded socket D formed with its axis inclined with respect to the aligned axes of the body A and conduit B, a substantially tubular clamp member E having a clamping jaw F secured in the socket D and a lubricant pressure operated piston G mounted for reciprocation within the clamping member E including a discharge orifice H in registration with the clamping jaw F.

The body A has a bore 2 therethrough communicating with the socket D at its forward end and having a relatively enlarged counter bore 3 at its rearward end. A rawhide cup washer 4 is disposed within the counter-bore 3 and urged into engagement with the adjacent end wall of the conduit B through the medium of a spring 5. The forward end of the conduit B has a flange 6 extending laterally therefrom which is located within a bushing 7 secured to the rearward end of the body A by cooperating screw threads 8 thus providing the swivel joint C wherein end play and sealing engagement between the body A and conduit B is attained through use of the spring pressed cup washer 4. When lubricant under pressure is present in the nozzle the lubricant pressure acts to augment the function of the spring 5, thereby affording sealing pressure at the joint comparable to the pressure of lubricant confined therein.

The forward portion of the body A is enlarged and fashioned with a face 11 lying in a plane perpendicular to the axis of the clamping member E. In the nozzle shown the axis of the clamping member is inclined 40° away from the axes of the body A and conduit B thus establishing the plane of the face 11 50° away from the axis of the body. The outer end of the clamping member E extends inwardly beyond the walls of the bore 12 thereof, a part of which is milled away to provide an elongated opening 13 extending across the forward end of the member and merging with a cylindrically walled aperture 14 having its axes perpendicular to the axis of the body A and through which the spherical head 15 of the lubricant receiving fitting N may be admitted to that space between the clamping jaw F and piston G.

The fitting engaging portions of the jaw F comprise spherical surfaces 16 formed on the inwardly extending portions of the clamping member E and are in registration with the discharge orifice H of the piston G. The wall of the piston G about the discharge orifice H is formed to provide an annular spherical contact surface 17 adapted for sealing contact with the head 15 of the fitting N. A bore 18 through the piston G serves to conduct lubricant from within the body A to the discharge orifice H. The piston G has a leather packing washer 19 held in place against the inner end of the piston by a compression spring 21 which also serves to urge the piston outwardly of the bore 12 to clamp the fitting head 15 yieldingly between the jaw surfaces 16 and the annular contact surface 17 of the piston G during the initial attachment of the nozzle upon the fitting.

In operation, the nozzle may be connected to a suitable source of pressure feed lubricant supply by means of a flexible hose 25 coupled to the conduit B by engaging the end fitting 26 of the hose with external screw threads 27 provided on the rearward end of the conduit. The body A of the nozzle containing the clamping mechanism and discharge means may be rotated at will relative to the conduit B and hose 25 so that the operator may vary the position of the fitting engaging clamp member E and the aperture 14 to best approach the fitting N for initial engagement therewith. The nozzle may be thus engaged with the fitting by lateral movement over the fitting to cause the spherical head 15 of the fitting to pass thru the cylindrical walled aperture 14 and to urge the piston G inwardly against the action of the spring 21 to clamp the head yieldingly between the surfaces 16 and 17 of the nozzle.

Lubricant under pressure admitted to the nozzle may now pass through the conduit B, the body A and into that space at the rear of the piston G where it may act to forcefully urge the piston forwardly into tight engagement with the fitting head 16 to thus establish a lubricant tight seal between the annular spherical surface 17 of the piston and the surface of the head 16.

Figure 2:
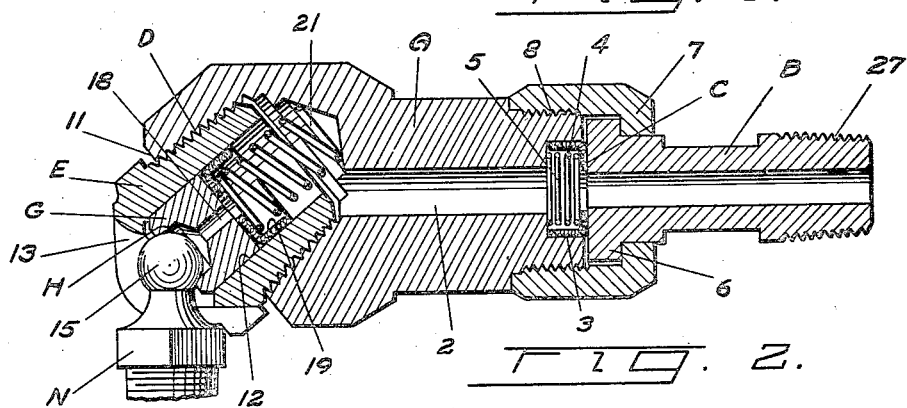
Fig. 2 is a sectional view of the nozzle clamped upon a lubricant receiving fitting.
Figure 3:
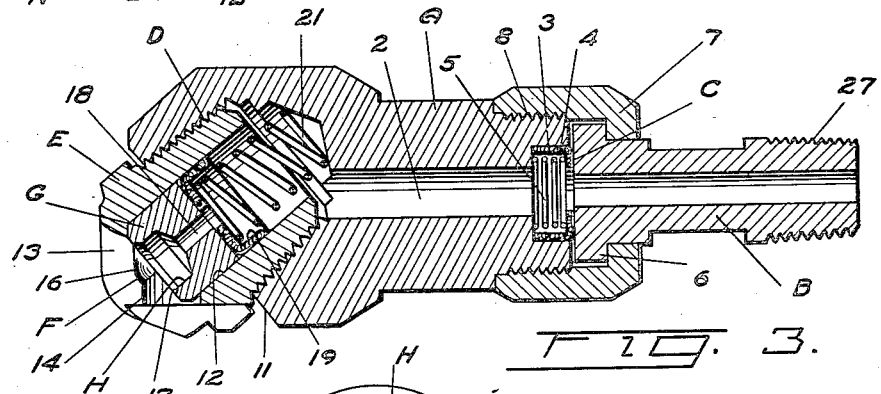
Fig. 3 is a sectional view of the nozzle detached from the fitting.
Figure 4:
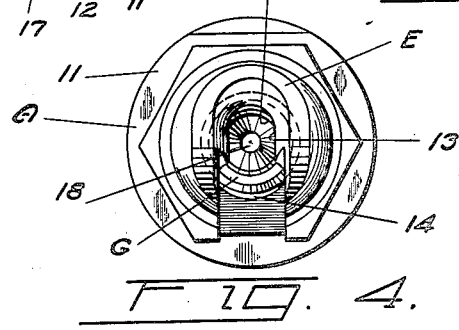
Fig. 4 is an end elevation of the fitting engaging portion of the nozzle.

With reference particularly to Fig. 2 it may be seen that engagement between the nozzle and fitting is such as to establish contact between surfaces generated about a common center, being the center of the head 16, thus permitting the nozzle to be moved over the fitting head within the limitation of the slotted portion 13 of the clamping member as to movement in a vertical plane and through a complete circle in any horizontal plane.

During the time that lubricant under pressure is present in the nozzle, the swivel joint C must remain tight by virtue of the functioning of the sealing washer 4.

Should it become necessary to replace either the clamping member E or piston G because of wear it is merely necessary to unscrew the clamping member E and simultaneously remove the two elements. The packing washer 19 may also be thus replaced.

An important feature of the nozzle is the simplicity of construction and the relatively few parts required as well as the ease with which it may be manufactured.

It is to be understood that the described embodiments of the invention herein set forth are presented for the purpose of illustration only and various changes may be made therein without departing from the spirit and scope of the invention.

I claim:

1. In a clamp type lubrication coupler for servicing a fitting having a head including a substantially spherical portion, a nozzle body having a conduit therethrough, means secured to said body and providing a nozzle discharge orifice and an annular fitting engaging sealing surface surrounding said orifice, said orifice having an axis inclined at an angle between zero degrees and ninety degrees with respect to the axis of said nozzle body conduit, and fitting clamping means having an opening for admission of said fitting head to said discharge orifice and said sealing surface along an axis substantially perpendicular to the axis of the nozzle body conduit.

2. A lubricant discharge nozzle comprising, an elongated body member having a bore therethrough adapted for connection at one end to a source of lubricant supply, means providing a cylindrical bore at the opposite end of the body and jaws for engaging with a lubricant receiving fitting at the outer end of the bore, said bore being inclined at an acute angle relative to the axis of said body, a piston member mounted for reciprocation in said bore having a discharge orifice therethrough surrounded by a contact surface adapted to cooperate with the external surface of said fitting to form a seal therewith, said means having an aperture having its axis substantially perpendicular to the axis of the body for admitting said fitting between said jaws and said piston, and resilient means for urging said piston outwardly of the bore toward said fitting engaging jaws.

3. In a clamp type lubrication coupler, a body member provided with a longitudinal bore, a member removably mounted in one end of said body member and having clamping jaws for clamping said nozzle upon and to a lubricant receiving fitting head, an element mounted within said removable member for movement along an axis inclined at an acute angle relative to the axis of said body, said removable member having an opening for the admission of a fitting head, the axis of said opening being substantially perpendicular to the axis of said body member, a conduit member having its bore aligned with the longitudinal bore of the body at the opposite end thereof and freely rotatable relative to the body member, and lubricant pressure operated sealing means between said body member and said conduit member.

4. A clamp type lubrication coupler comprising, a body member having a bore therethrough, means providing a cylindrical bore at one end of the body and having jaws overhanging said bore for engagement with a lubricant receiving fitting at the outer end of the bore, said bore having its axis inclined at about 40 degress relative to the axis of the body, and a clamping member slidably mounted in said bore, said clamping member having a discharge orifice therethrough surrounded by a contact surface adapted to cooperate with the external surface of said fitting to form a seal therewith, said means having a fitting receiving aperture with the axis of the aperture substantially perpendicular to the axis of the body.

5. A clamp type lubrication coupler comprising, an elongated body member providing a conduit and adapted for connection at one end to a source of lubricant supply, means providing a cylindrical bore at the opposite end of the body and jaws for engaging with a lubricant receiving fitting at the end of the bore, said bore being inclined at an acute angle relative to the axis of said body member, and a piston member mounted for reciprocation in said bore parallel to the axis thereof, said piston member having a discharge passage therethrough, said passage being surrounded at its outer end by a contact surface adapted to cooperate with the external surface of said fitting to form a seal therebetween, said contact surface constituting a spherical zone disposed substantially at right angles to the axis of said piston member, the fitting engaging surfaces of said jaws being spherical in contour, said jaws being spaced and arranged to provide a fitting receiving opening therebetween, said opening having its axis directed at an acute angle to the axis of the piston discharge passage.

6. A clamp type lubrication coupler comprising, a body member forming a conduit and adapted for connection at one end to a source of lubricant supply, means providing a cylindrical bore at the opposite end of the body and jaws for engaging with a lubricant receiving fitting at the outer end of the bore, said bore being inclined at an acute angle relative to the axis of said body, and a clamping member slidably mounted in said bore and having a discharge passage therethrough, said passage being surrounded at its outer end by a contact surface adapted to cooperate with the external surface of said fitting to form a seal therebetween, said means further providing an aperture, said aperture having its axis substantially perpendicular to the axis of the body for admitting said fitting between said jaws and said clamping member.

7. A clamp type lubrication coupler comprising, a body member having a lubricant passage therethrough, means for connecting one end of said body with a source of lubricant supply, a tubular clamping member removably mounted upon the opposite end of the body and having its bore inclined at an angle between zero degrees and ninety degrees with respect to the longitudinal axis of the body and communicating with the passage in said body, jaws formed on said clamping member for engagement with a lubricant receiving fitting, a piston member mounted for reciprocation in the bore of said clamping member and having a lubricant passageway therethrough communicating with said passage in said body member, the outer end of said piston passage providing a discharge orifice defined by a circular contact surface, said contact surface being disposed substantially at right angles to the axis of said piston member, said jaws being spaced and arranged to provide a fitting receiving opening, said fitting receiving opening having its axis directed at an acute angle to the axis of the said passageway through the piston member.

8. A clamp type lubrication coupler comprising, a body member having a lubricant passage therethrough, means for connecting one end of said body with a source of lubricant supply, a tubular clamping member removably mounted upon the opposite end of the body and having its bore inclined at an angle of substantially forty degrees with respect to the longitudinal axis of the body and communicating with the passage in said body, jaws formed on said clamping member for engagement with a lubricant receiving fitting, a piston member mounted for reciprocation in the bore of said clamping member and having a lubricant passageway therethrough communicating with said passage in said body member, the outer end of said piston passage providing a discharge orifice defined by a circular contact surface, said contact surface being disposed substantially at right angles to the axis of said piston member, said jaws being spaced and arranged to provide a fitting receiving opening, said fitting receiving opening having its axis directed at an acute angle to the axis of the said passageway through the piston member.

HARRY R. TEAR.